US005339716A

United States Patent [19]

[11] Patent Number: 5,339,716

Sands et al.

[45] Date of Patent: Aug. 23, 1994

[54] MINI BLIND CUTTER

[75] Inventors: Jeffrey L. Sands, Freeport; Robert J. Dagel, Ridott; John A. Elsenheimer, Freeport, all of Ill.

[73] Assignee: Newell Operating Co., Freeport, Ill.

[21] Appl. No.: 23,786

[22] Filed: Feb. 22, 1993

[51] Int. Cl.[5] ........................ B23D 23/00; E06B 9/266

[52] U.S. Cl. ........................ 83/452; 83/629; 29/24.5

[58] Field of Search .................... 29/24.5, 433; 83/627, 83/633, 485, 452, 800, 629, 39, 433

[56] References Cited

U.S. PATENT DOCUMENTS

| | | | |
|---|---|---|---|
| 1,721,276 | 7/1929 | Marsilius | 83/629 X |
| 2,883,736 | 4/1959 | Crane | 83/800 X |
| 3,584,380 | 6/1971 | Mehler et al. | 83/629 X |
| 4,468,995 | 9/1984 | Mireles-Saldivar | 83/629 X |
| 4,819,530 | 4/1989 | Huang | 29/24.5 X |
| 4,993,131 | 2/1991 | Graves et al. . | |
| 5,037,253 | 8/1991 | Molaro et al. | 29/24.5 X |
| 5,072,494 | 12/1991 | Graves et al. . | |
| 5,103,702 | 4/1992 | Yannazzone | 83/39 X |

*Primary Examiner*—Rinaldi I. Rada
*Attorney, Agent, or Firm*—Foley & Lardner

[57] ABSTRACT

The present invention relates to a cutter for cutting the ends from a mini blind so that the mini blind may be custom sized for a particular window opening. The mini blind cutter includes a framework which has a receiving area for receiving an end of the mini blind. A cutter blade is attached to a slide bar which is slidably mounted in the framework. The slide bar includes a rack engaged with a pinion gear that is rotated by a ratchet handle. Movement of the ratchet handle thus slides the slide bar along the framework and forces the cutter blade through the end of the mini blind.

19 Claims, 9 Drawing Sheets

MINI BLIND CUTTER

TECHNICAL FIELD

The present invention relates generally to the art of sizing window coverings, such as mini blinds. More particularly, the present invention relates to a cutter for cutting a plurality of adjacent layers of material and includes a ratcheting mechanism that facilitates continuous cutting pressure against the material being cut to ensure a high quality cut.

BACKGROUND OF THE INVENTION

Numerous types of window coverings are now being sold at a variety of outlets. Window coverings of the type with which the present invention is concerned include mini blinds as opposed to draperies and curtains which may be sold in the same outlets but which involve different sizing requirements.

The types of outlets that sell mini blinds include custom specialty shops and department stores which usually ask the customer for window dimensions and then submit orders to factories or distribution centers where the products are cut to a specific size. Not only must the customer make two visits to these outlets to obtain the product, but the custom mini blinds are relatively expensive.

Mass merchandisers also distribute mini blinds. In many such outlets, only stocked sizes are carried, because some windows, especially in newer homes and offices, are of standard dimensions. These mini blinds are usually much less expensive than those obtained from custom outlets because of the economies realized from carrying a limited stock of sizes, and because there are no sizing operations which must be performed on the products.

In recent years, a third option has been made available to the customer. This option involves the in-store sizing of mini blinds and various other window coverings to customer specifications. An example of how in-store sizing can be accomplished is disclosed in commonly owned U.S. Pat. No. 5,072,494, issued Dec. 17, 1991 to Graves et al. for "Method and Apparatus for Infinitely Sizing a Mini Blind" and its parent, U.S. Pat. No. 4,993,131, issued Feb. 19, 1991 to the same inventors and with the same title. In the device shown in these patents, mini blinds of a specific design are sized to customer specifications on a machine. The mini blind itself includes a head rail, a bottom rail, a plurality of slats, a tilter bar, and a rope system having ladders for raising and lowering the slats and for locking the blind in a desired open or closed position. The mini blind product used with the system illustrated in these two patents includes one ladder fixed in place. The other ladder is not installed at the factory, but is placed over the slats near the installed ladder. To custom size the mini blind in the store, the blind is cut on one side, with the cutting apparatus cutting through the head rail, bottom rail, and each of the individual slats. A drill is then used to provide holes in each of the blind slats at a location picked by the operator to match the spacing of the installed ladder. The two ladders are thus spaced to the same distance from the ends of the blind. The unsecured ladder is then moved into alignment with the holes and a cord is passed through the slats and secured at the bottom rail.

The cutter used to cut the mini blinds is constructed of structurally strong materials to allow the plurality of slats and the bottom rail to be cut in a single cutting operation in most circumstances. The slats are disposed adjacent one another as the adjacent ends along one side are slid into the cutter. A cutter blade mounted on a cutting bar and appropriately configured to provide the ends of the slats with the desired shape, is then moved tightly against the stack of adjacent slats. A cutting mechanism, typically using either a pump or a cutting bar rack driven by a pawl attached to a lever, moves the cutting bar and attached knife into and through the bottom rail and slat material. One problem with some of these cutters is that insufficient leverage makes it difficult to cut mini blinds unless the cutting machine and lever are quite large. Another problem is rapid wear on the cutter blade particularly when cutting aluminum.

Due to the difficulty encountered in cutting all of the components of a blind in one operation, it is also often desirable to cut the head rail of the mini blind either alone or consecutively with the cutting of the slats. A space is provided in the cutter for receiving an end of the head rail and sometimes the cutter also includes a center portion disposed for insertion into the head rail to help hold it in place. One problem with this arrangement is that the head rail is not held securely enough to provide a high quality cut. This is particularly a problem, when the head rail has various grooves, slots, or other complex shapes which sometimes tend to cause a greater twisting action when being cut by the knife.

SUMMARY OF THE INVENTION

The present invention provides a mini blind cutter for cutting mini blind slats as well as mini blind bottom rails and head rails to a desired size. The mini blind cutter may be used to cut the mini blind slats and rails on either end so readjustment of mounting mechanisms or ladders is not required when sizing the mini blind.

The mini blind cutter according to the present invention, includes a framework having a receiving area disposed within it for receiving the end of the mini blind. A slide bar assembly is slidably mounted in the framework and is oriented for sliding motion towards and away from the receiving area. A cutter blade, attached to the slide bar assembly is moved through the receiving area to cut through the end of the mini blind.

The slide bar assembly further includes a rack having a plurality of teeth. A pinion gear is rotatably mounted in the framework in mating engagement with the rack. As the pinion gear is rotated by a ratchet handle attached to it, the pinion gear drives the rack to impart sliding motion to the slide bar assembly.

DESCRIPTION OF THE DRAWINGS

The invention will hereafter be described with reference to the accompanying drawings, wherein like referenced numerals denote like elements, and.

DETAILED DESCRIPTION OF THE PREFERRED EMBODIMENT

In the following description, reference will be made to a mini blind cutter 10. The cutter 10 is used to cut one or both ends of a mini blind to properly size the mini blind for a given window opening. Preferably, the bottom rail, slats, and head rail may all be downsized with cutter 10. Mini blind cutter 10 could also be adapted to cut a wide variety of venetian or even vertical blinds.

Figure 1:
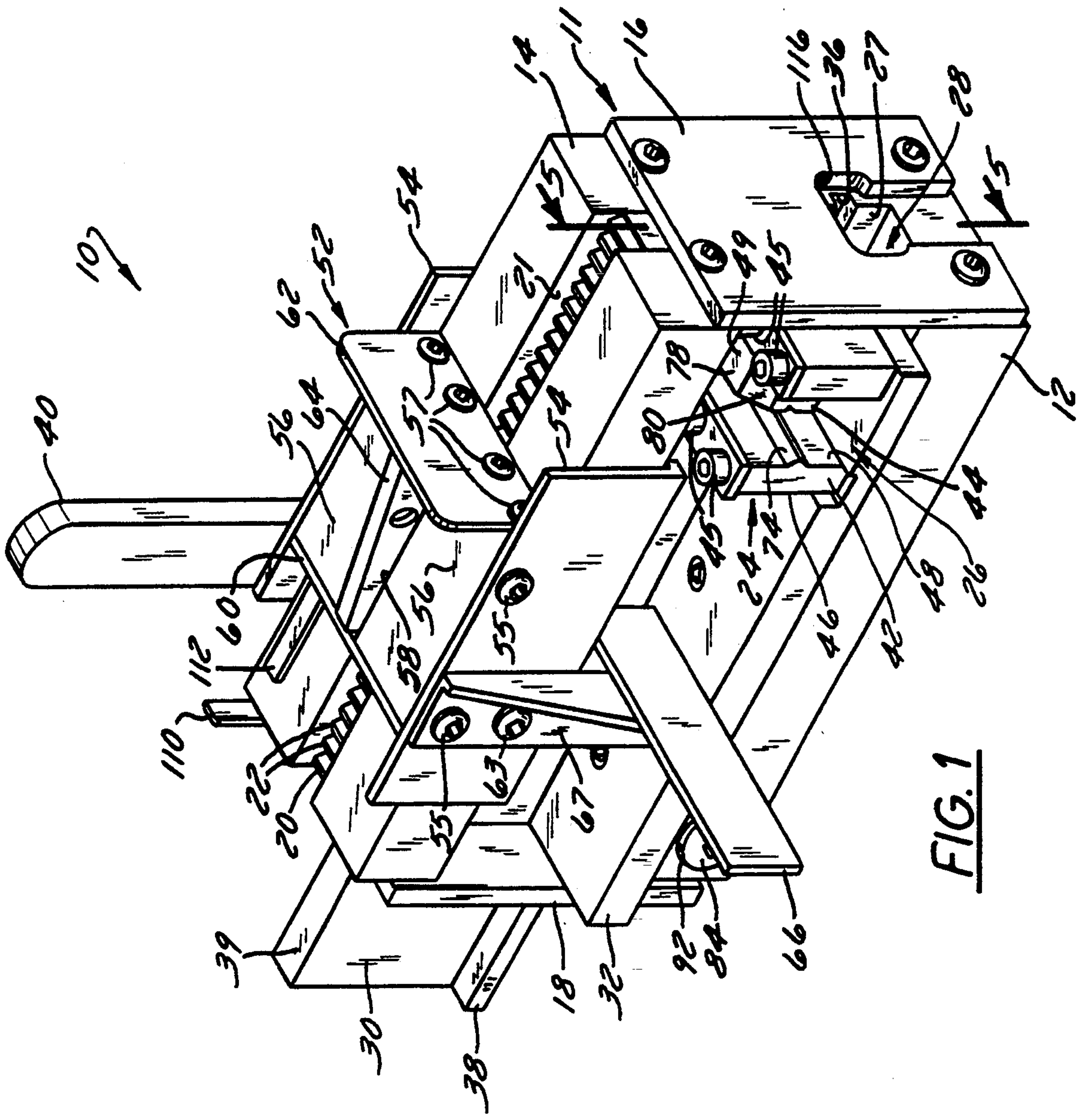
FIG. 1 is a perspective view of a mini blind cutter according to the most preferred form of the present invention.

Referring generally to FIG. 1, mini blind cutter 10, according to the present invention, includes a framework 11 having a base 12, a top 14, and first and second end plates, 16 and 18, respectively, which hold base 12 at a spaced distance from top 14. First end plate 16 and second end plate 18 may each be made from a single plate of material or multiple plates. Top 14 includes a top rack (ratchet) gear 20, preferably disposed longitudinally along the center of top 14 from end to end. Rack gear 20 can be integrally formed in top 14 or made as a separate component received and affixed in a slot 21 of top 14. Rack gear 20 includes a plurality of teeth 22 extending upwardly but preferably not past the upper surface of top 14. Base 12, top 14, and end plates 16, 18 support the various components of mini blind cutter 10.

Also, disposed between base 12 and top 14 are the receiving areas for receiving the mini blind components to be cut. A slat receiving area, designated generally as 24, is designed for receiving the ends of a stack of adjacent mini blind slats and an end of the bottom rail. Similarly, a head rail receiving area, designated generally as 26, is configured for receiving and securely holding the ends of the head rail as it is cut.

Figure 6:
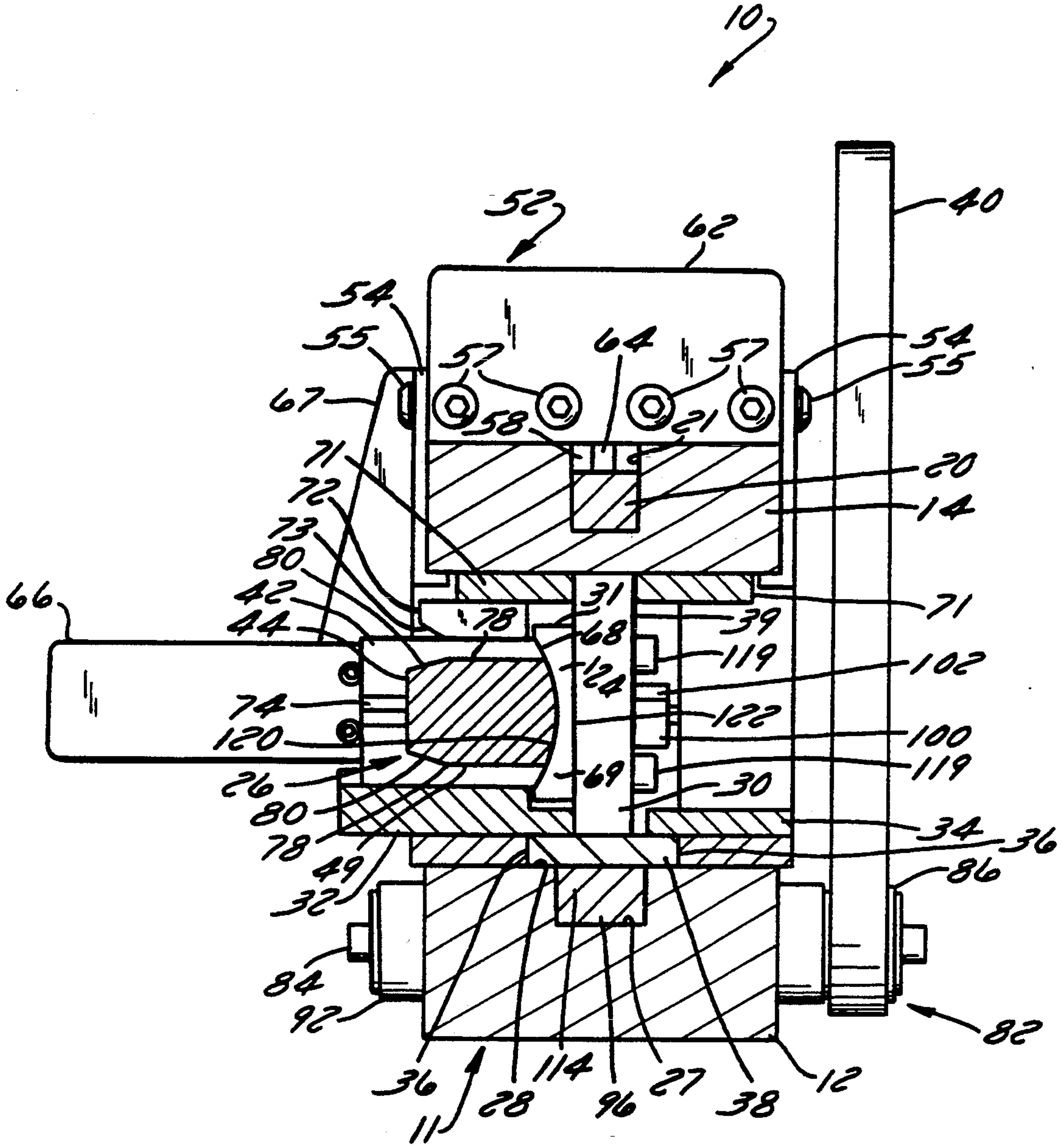
FIG. 6 is a cross-sectional view taken generally along line 6—6 of FIG. 2.

Base 12 includes a groove 27 disposed longitudinally along base 12 to provide the base with a generally U-shaped cross-section (see FIG. 6). Groove 27 forms part of a slide channel 28 open towards top 14 and configured for slidably receiving a slide rail or slide bar assembly 30 on which is mounted a cutter blade 31 (see FIG. 2). Preferably, a front guide plate 32 and a rear guide plate 34 are affixed to base 12 generally along slide channel 28 but spaced apart sufficiently to guide the movement of slide rail 30 therebetween. Each guide plate, 32 and 34, is fabricated to include a notched portion 36 that communicates with groove 27 and provides slide channel 28 with a T-shaped appearance. More specifically, plates 32 and 34 are formed from two plate portions one offset from the other to form portions 36. Notched portions 36 extend longitudinally along the entire length of each guide plate to receive a stabilizer member 38 of slide rail 30. Stabilizer member 38 comprises a small plate disposed generally perpendicular to a main cutter bar 39 of slide rail 30. Stabilizer member 38 provides slide rail 30 with a generally T-shaped cross--section which slides along slide channel 28. By combining the T-shaped slide rail 30 and the closely toleranced T-shaped slide channel 28, slide rail 30 may be moved with a very linear, uniform, consistent, and stable motion along base 12. A ratchet handle 40 cooperates with a ratchet assembly 82 (discussed below) to move slide rail 30 along slide channel 28.

Front guide plate 32 is also configured for receiving a slat shear plate 42 and an anvil 44 which are both rigidly attached thereto by a plurality of fasteners 45, such as bolts. Slat shear plate 42 is disposed adjacent receiving area 24 and includes a shearing surface 46 against which the stack of mini blind slats and bottom rail are sheared or cut. A back surface 48 is adjacent head rail receiving area 26 and appropriately shaped to match the contour of the head rail bottom when the head rail is inserted into receiving area 26. Anvil 44 is disposed in head rail receiving area 26 and has an outer profile 49 designed to correspond with the inner contour of the head rail. In this manner, when the head rail is slid into receiving area 26, both the inside and outside of the head rail are bordered by contoured outer profile 49 and back surface 48. This securely holds the head rail in place and substantially prevents twisting of the head rail while it is cut, thus providing a high quality cut.

A clamp assembly 52 is slidably mounted over top 14 and includes a pair of side brackets 54 which preferably have an L-shaped cross--section. Brackets 54 extend along at least a portion of the sides and bottom of top 14. A pair of fasteners 55, such as screws, fasten each bracket 54 to a support plate 56. Support plates 56 extend along the upper surface of top 14 towards rack gear 20, but do not come in contact with one another, thus leaving a space 58 therebetween. Fasteners 57, such as screws, fasten support plates 56 to a rear tie plate 60 and a front tie plate 62 in a parallel relationship. A pawl 64 is disposed between rear tie plate 60 and front tie plate 62 and is pivotably mounted between support plates 56 in space 58. The pivotal mounting may be accomplished in various ways, for instance, by using a pin 65 extending between plates 56 and through an aperture in pawl 64.

Clamp assembly 52 also includes a clamp bar 66 for holding the bottom rail and slats of the mini blind against shearing surface 46. Clamp bar 66 is supported relative to assembly 52 by a clamp bracket 67 which is fastened to front side bracket 54 by one fastener 55 and a fastener 63, such as a bolt or screw. Accordingly, clamp bar 66 moves longitudinally back and forth along front guide plate 32 in unison with assembly 52 and preferably extends outward of base 12 to provide additional support against the mini blind slats and bottom rail. The provision of bar 66 assists in maintaining the blind slats substantially perpendicular to the direction of travel of slide rail 30 during cutting.

Assembly 52 is moved independently of slide rail 30 and blade 31 towards first end plate 16 to clamp the mini blind bottom rail and slats against surface 46 and pawl 64 is pivoted into engagement with rack gear 20 to prevent the clamp assembly from moving back towards second end plate 18. After cutting, clamp assembly 52 can freely be moved back by manually pivoting pawl 64 out of cooperation with rack gear 20.

Figure 2:
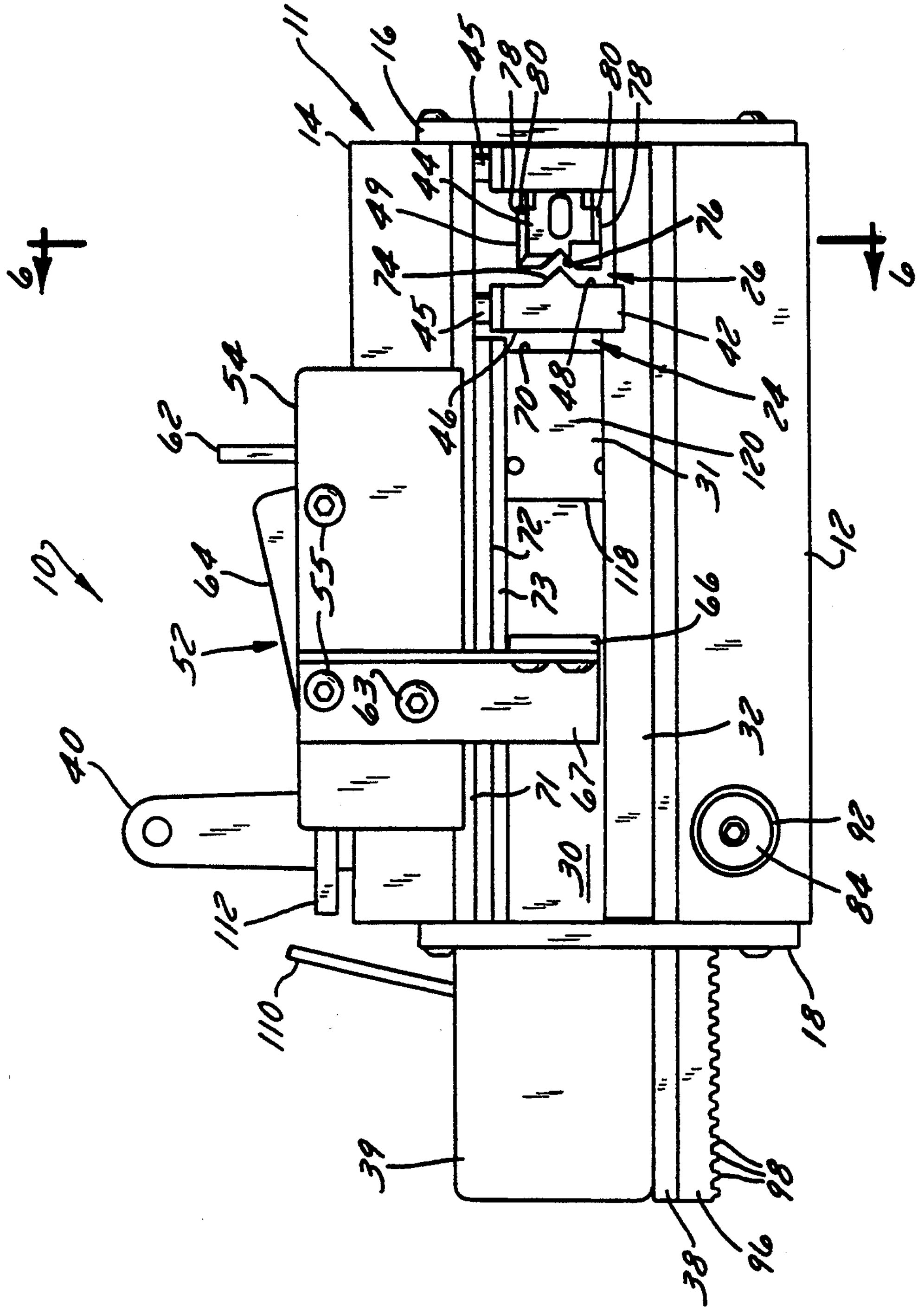
FIG. 2 is a front view of the mini blind cutter.

As illustrated in FIG. 2, cutter blade 31 is affixed to slide rail 30 to move into and out of cooperation with shear plate 42 and anvil 44. Cutter blade 31 includes a cutting edge 70 which is preferably arcuate to provide the mini blind slats, as well as the bottom rail and head rail, with matching curved ends having a more pleasing appearance. However, although an arcuate cutting edge is preferred, other shapes could also be used to give the mini blind ends a different appearance.

Regardless of the shape of the cutting blade, shear plate 42 and anvil 44 each include a contoured surface, 68 and 69, respectively, (see FIG. 6) to provide high quality shearing when the mini blind components are cut. Contoured surfaces 68 and 69 substantially match the arcuate contour of cutting edge 70. In other words, arcuate edge 70 is consistently toleranced to both shear plate 42 and anvil 44 at any given point. This facilitates high cut quality, because, if portions of the knife blade are not closely toleranced to the shear plates, parts of the mini blind, particularly the thin slats, will be bent, frayed, or disfigured due to the gap between the knife blade and the shear plate at that point. Maintaining a close match between the precisely contoured surfaces 68 and 69 and cutting edge 70 is particularly important when cutting materials such as aluminum. However, acceptable tolerances will vary depending on the material being cut.

Other components also assist in providing a uniform and high quality cut. For instance, a pair of guides 71 are affixed to top 14 (see FIG. 6), one on each side of cutter bar 39 to further limit any sloppiness or twisting of slide rail assembly 30 during the cutting of the mini blind. Also, a support block 72 extends downward from guides 71 into slat receiving area 24. Support block 72 is sized to extend into close proximity with the stack of mini blind slats when they are inserted into slat receiving area 24. Thus, the stack of mini blind slats and the mini blind bottom rail are closely contained on all sides by front guide plate 34, shearing surface 46, clamp bar 66, and support block 72. Specifically, support block 72 prevents the slats from bowing upward under the cutting pressure of cutter blade 31. Preferably, support block 72 includes a tapered edge 73 to facilitate insertion of the bottom rail and slats into receiving area 24.

As mentioned previously, back surface 48 of shear plate 42 and anvil 44 are designed to correspond closely with the exterior and interior, respectively, of the head rail being cut. In the most preferred embodiment, back surface 48 and anvil 44 are configured to receive a head rail having a bottom side that is strengthened by a generally V-shaped groove recessed towards the center of the head rail. Accordingly, back surface 48 includes a triangular ridge 74 which matches the shape of the head rail groove. Similarly, anvil 44 includes a V-shaped cut-out portion 76 appropriately shaped to slidably receive the groove portion that extends inside the head rail. The ridge 74 and the cut-out portion 76 also prevent the user from inadvertently cutting the wrong head rail, since head rails of other configurations will not fit between back surface 48 and anvil 44.

Anvil 44 also includes top and bottom sides 78 appropriately spaced to be in close contact with the inside surfaces of the sides of the head rail. Additionally, anvil 44 includes a plurality of tapered edges 80 disposed to facilitate insertion of the head rail into head rail receiving area 26.

Figure 3:
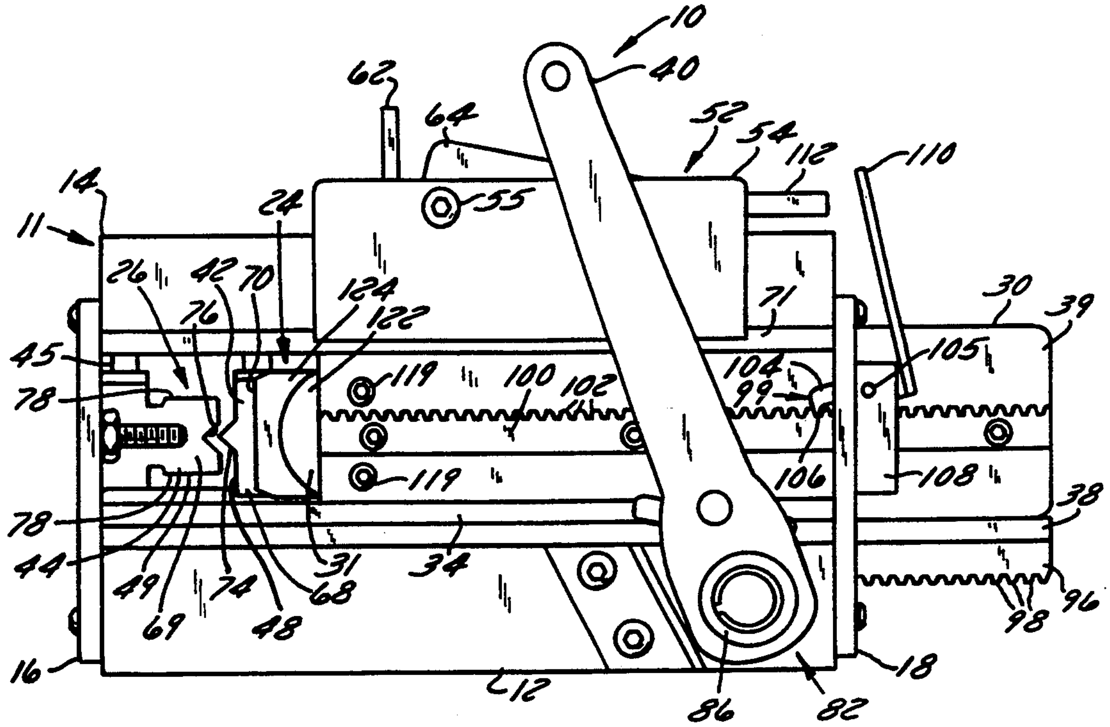
FIG. 3 is a back view of the mini blind cutter showing a clamp assembly in a position for clamping blind slats.
Figure 5:
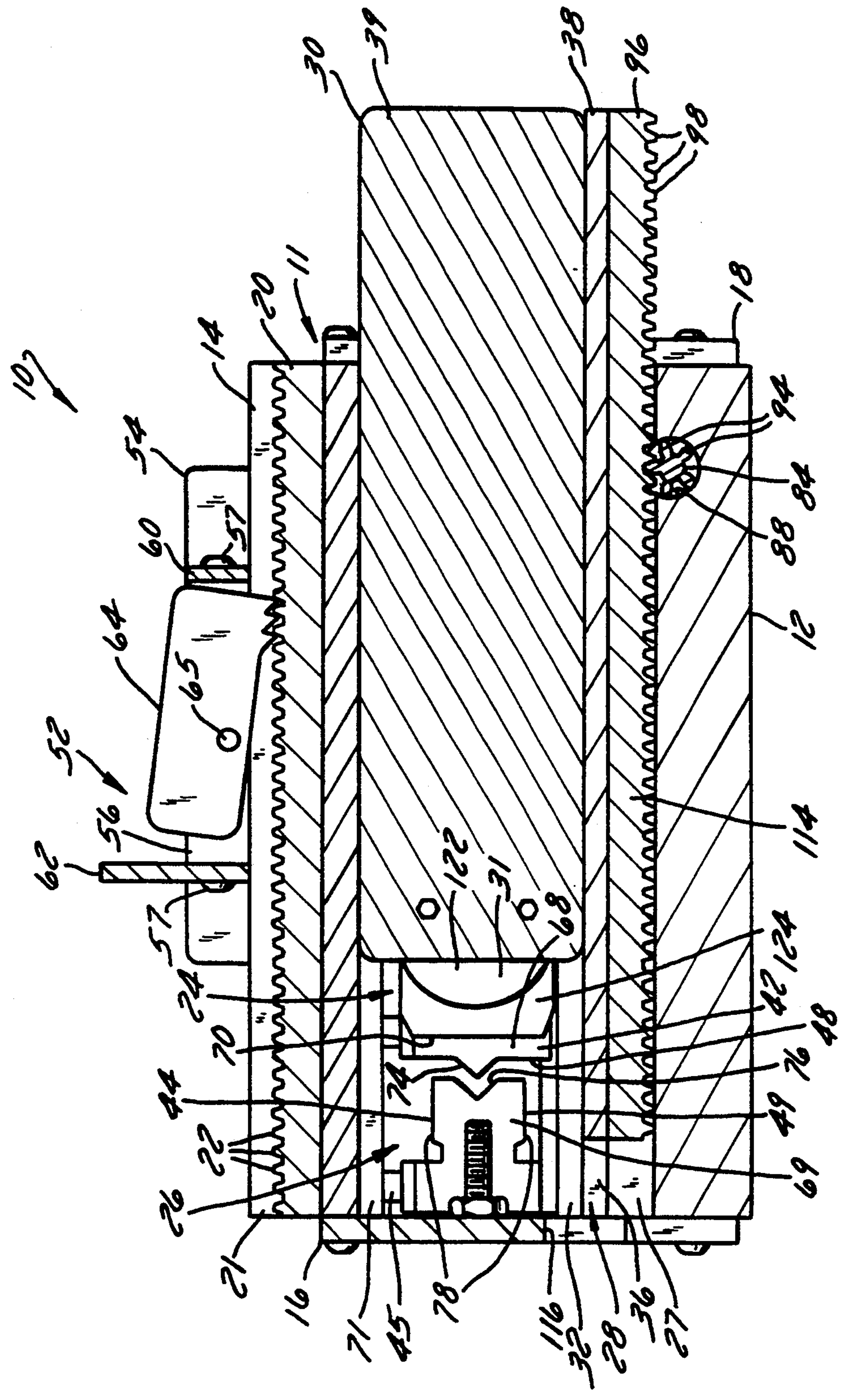
FIG. 5 is a cross-sectional view taken generally along line 5—5 of FIG. 1.

Referring now generally to FIGS. 3 and 5, a ratcheting assembly designated generally as 82 is illustrated. Ratcheting assembly 82 includes ratchet handle 40 which is mounted to a pinion gear 84. Ratchet handle 40 preferably includes a ratcheting mechanism 86 that is adjustable so handle 40 may be ratcheted in a clockwise or counter clockwise direction. A variety of ratchet handles could be attached to pinion gear 84, but the ratchet Handle No. 101, Series 100 manufactured by Lowell Corporation is preferably used.

Pinion gear 84 is rotatably mounted in a bore 88 extending transversely through base 12. Preferably, pinion gear 84 is mounted in a brass bushing bearing and retained in bore 88 by a retainer ring 92 affixed to the end of pinion gear 84 opposite ratchet handle 40 as is most clearly shown in FIG. 2. Pinion gear 84 includes a plurality of gear teeth 94 cooperating with a slide rail rack 96 which forms the bottom of slide rail 30 and is disposed in base groove 27. Thus, by rotating pinion gear 84 back or forth, slide rail 30 will be moved back or forth along slide channel 28. The combined pinion gear 84 and ratchet handle 40 provide great leverage for moving slide rail 30.

Rack 96 can be formed in the bottom portion of slide rail 30 with stabilizer member 38 attached in two parts along the sides of slide rail 30, or rack 96 can comprise a separate piece of material affixed to the bottom side of stabilizer member 38 by appropriate fasteners such as screws. Slide rail rack 96 includes a plurality of teeth 98 matingly engaged with gear teeth 94 of pinion gear 84.

As illustrated in FIG. 3, a retention assembly 99, according to one embodiment of the invention, is used to maintain cutting edge 70 against the mini blind components being cut. An alternate and preferred retention assembly will be described below with reference to FIGS. 10 and 11. Retention assembly 99 includes a retention rack 100 having a plurality of teeth 102 and a retainer pawl 104 that cooperates with teeth 102. Retention rack 100 is affixed along the side of slide rail 30 generally parallel with stabilizer member 38 and, accordingly, it moves longitudinally with slide rail 30. Retaining pawl 104 cooperates with retention rack 100, permitting slide rail 30 to move towards shear plate 42 and anvil 44. However, it prevents slide rail 30 from sliding in the opposite direction until retaining pawl 104 is selectively disengaged from teeth 102 of retention rack 100. Specifically, retaining pawl 104 is pivotably mounted on a pivot pin 105 located above retention rack 100. Pawl 104 also includes a tip 106 appropriately angled along one side so retaining pawl 104 merely rides over teeth 102 as slide rail 30 is moved towards first end plate 16. However, the location of pivot pin 105 and the shape of tip 106 prevent movement of slide rail 30 away from first end plate 16 until tip 106 is pivoted out of engagement with retention rack 100. Preferably, pivot pin 105 is mounted on a bracket 108 attached to second end plate 18. Retaining pawl 104 also includes an extension 110 which allows a user to pivot pawl 104 out of engagement with retention rack 100 when slide rail 30 is moved away from first end plate 16. Extension 110 is optimally configured to cooperate with an actuator arm 112 extending outward towards second end plate 18 from clamp assembly 52.

Figure 4:
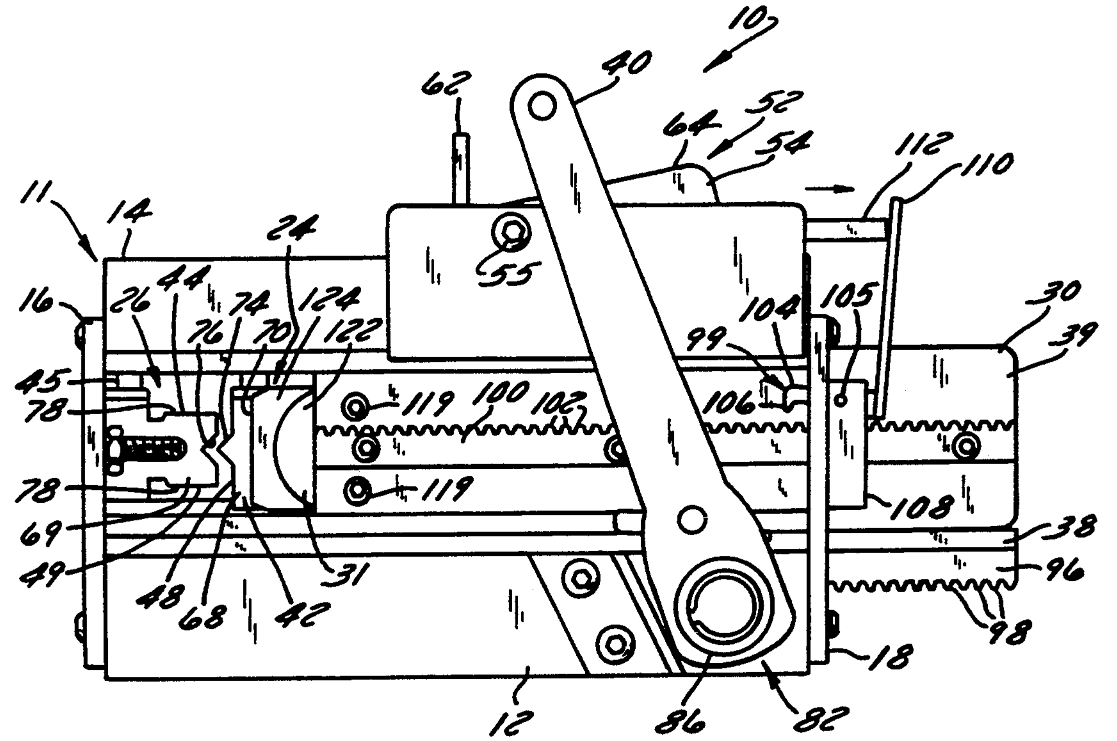
FIG. 4 is a back view of the mini blind cutter showing the clamp assembly returned to its original position.

As shown most clearly in FIG. 4, if pawl 64 of clamp assembly 52 is pivoted out of engagement with rack gear 20, the assembly 52 can manually be moved back towards second end plate 18. When clamp assembly 52 is moved back a sufficient distance, actuator arm 112 contacts extension 110 and pivots retaining pawl 104 out of engagement with retention rack 100. Then slide rail 30 can also be manually moved back towards second end plate 18 until both mini blind receiving areas 24 and 26 are open for receiving the components of the next mini blind to be cut.

Additionally, retention system 99 can use components other than retention rack 100 and retaining pawl 104. For instance, as discussed in greater detail below, a friction member could be adjustably mounted along slide rail 30. The member would then be appropriately tightened or biased against slide rail 30 to provide friction sufficient to prevent slide rail 30 from moving back towards second end plate 18.

The overall operation of mini blind cutter 10 can best be understood with reference to FIGS. 1 and 5, although occasional reference to other Figures will also be necessary to understand the relationship of various components. When a mini blind is cut, clamp assembly 52 and cutter blade 31 are moved towards second end plate 18 to provide sufficient room for insertion of the mini blind components. The bottom rail and stack of adjacent slats are then inserted into slat receiving area 24 while the head rail is inserted into head rail receiving area 26 over the outer profile 49 of anvil 44. However, the head rail and the combination of bottom rail and slats could be inserted and cut at separate times.

Next, the bottom rail and slats are firmly clamped against shearing surface 46 by sliding clamp assembly 52 towards first end plate 16 until clamp bar 66 presses the bottom rail and slats firmly against each other and against shearing surface 46. Ratchet handle 40 is then appropriately set to ratchet slide rail 30 and cutter blade 31 towards the mini blind. Each time ratchet handle 40 is ratcheted forward, pinion gear 84 rotates and drives slide rail rack 96 towards first end plate 16. Simultaneously, slide rail 30 and cutter blade 31 are moved towards the mini blind until cutting edge 70 contacts the bottom rail and adjacent slats. As ratchet handle 40 is continually ratcheted forward, cutting edge 70 cuts through the bottom rail and adjacent slats until the final slat is sheared off against shear plate 42.

Following the cutting of the bottom rail and slats, cutter blade 31 is ratcheted past conforming surface 68 of shear plate 42 until it contacts and cuts through the head rail. Since the head rail is securely held between back surface 48 and anvil 44, there is very little twisting or bending of the head rail while it is being cut. This lack of bending or twisting combined with the conforming shape of anvil 44 and cutting edge 70, as well as the tight tolerances between anvil 44 and cutting edge 70, provide a high quality cut having minimal bent, torn, or scratched segments.

Once the bottom rail, adjacent slats, and head rail are cut, pawl 64 is pivoted out of engagement with rack gear 20 and clamp assembly 52 is slid back towards second end plate 18 until actuator arm 112 pivots retaining pawl 104 out of engagement with retention rack 100. Following this, either slide rail 30 is manually moved back towards second end plate 18, or ratcheting mechanism 86 is switched to reverse mode and ratchet handle 40 is used to move slide rail 30 and cutter blade 31 back towards second end plate 18. Once cutter blade 31 is free from anvil 44 and shear plate 42, slide rail 30 is easily moved by hand until cutter blade 31 is clear of slat receiving area 24. Slide rail 30 could be moved all the way back by using ratchet handle 40 in reverse mode, however, it is quicker to slide it by hand.

Preferably, a clean-out structure 114 extends from slide rail 30 generally below cutter blade 31. Clean-out structure 114 may be a separate component or integrally formed with slide rail 30, stabilizer member 38, and slide rail rack 96. Regardless, clean-out structure 114 is configured to slide through slide channel 28 below cutter blade 31 to prevent the cut-off portions of the mini blind from falling into and potentially clogging slide channel 28. If any debris does fall into slide channel 28, clean-out structure 114 pushes it through a clean-out aperture 116 formed through first end plate 16.

As illustrated in FIG. 6, the precise arrangement of components is important for providing a quality product. For instance, base groove 27 and notched portions 36 are configured for close mating engagement with slide rail rack 96 and stabilizer member 38, respectively. Additionally, the contoured ends, 68 and 69, of shear plate 42 and anvil 44 are precisely matched to the contour of cutter blade 31, particularly cutting edge 70. Additionally, shear plate 42 and anvil 44 are precisely mounted over slide channel 28 so that as cutter blade 31 moves past the contoured surfaces 68 and 69, it remains in tightly toleranced proximity. The cutting tolerance between contoured surfaces 68 and 69 and cutting edge 70 is preferably 100 percent or less of material thickness for materials such as vinyl, and 20 percent or less of material thickness, and most preferably 5 percent or less of material thickness for materials such as aluminum. Of course, the degree of precision and tolerances required will vary depending upon the type of materials for which the blind cutter is designed.

Figure 7:
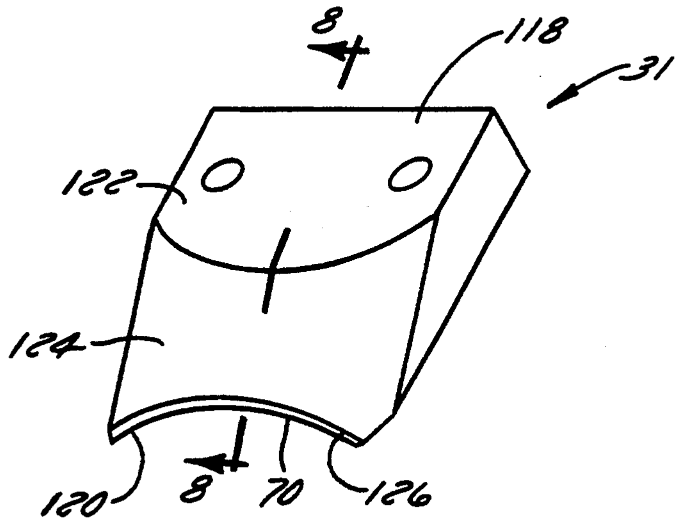
FIG. 7 is a perspective view of the cutting blade.
Figure 8:
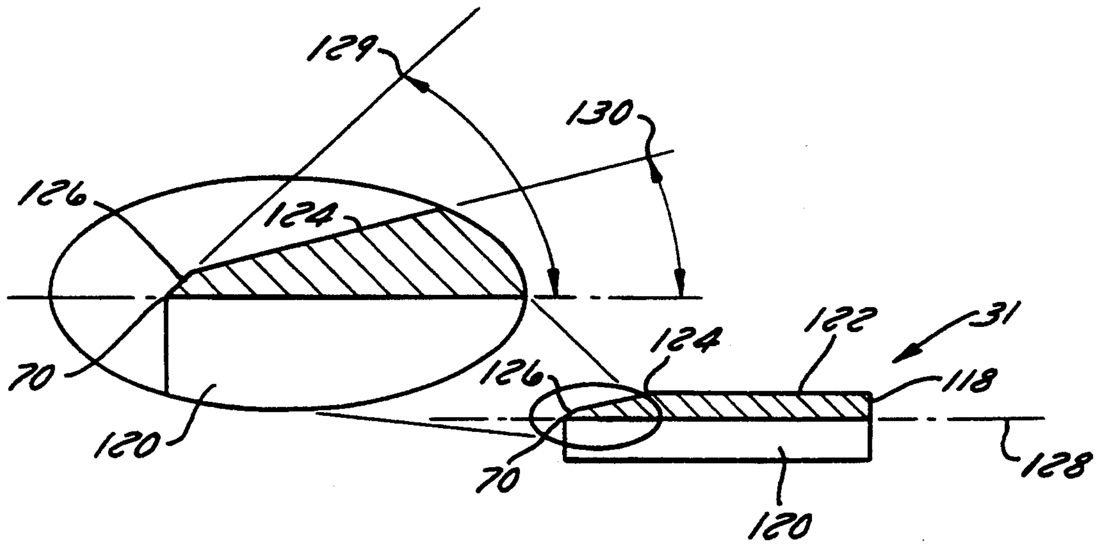
FIG. 8 is a cross-sectional view taken generally along line 8—8 of FIG. 7.

Another important aspect of the cutter, is the configuration of cutter blade 31 which is illustrated in FIGS. 7 and 8. Cutter blade 31 includes cutting edge 70 disposed at one end and an attachment region 118, disposed at the opposite end, for attaching cutter blade 31 to slide rail 30 by fasteners 119 such as screws. Cutter blade 31 includes a front arcuate surface 120, that generally coincides with the arc of cutting edge 70, and a back surface 122. However, as mentioned above, blade 70 and front surface 120 may be shaped differently than the arcuate shape illustrated depending on the desired design for the ends of the mini blind.

Cutter blade 31 includes a tapered region 124 which tapers from back surface 122 into general proximity with cutting edge 70. Preferably, blade 70 and tapered region 124 are separated by a bevel 126. Bevel 126 is disposed at a different angle than is tapered region 124. With reference to a longitudinal axis 128 of cutter blade 31, bevel 126 preferably forms a larger acute angle 129 with longitudinal axis 128 than does tapered region 124 which forms an acute angle 130. In other words, bevel 126 is closer to being perpendicular with longitudinal axis 128 than is tapered region 124. In a preferred embodiment, angle 129 is between 20 degrees and 50 degrees, and in the most preferred embodiment it is between 32 degrees and 36 degrees. Angle 130 is preferably between 5 degrees and 45 degrees and most preferably between 22 degrees and 26 degrees. Generally, it is also preferred that angle 129 is 5 to 15 degrees larger than angle 130, although angle 129, angle 130, and their relationship to each other will vary depending upon the type of materials for which the mini blind cutter is designed. Additionally, the length of bevel 126 between cutting edge 70 and tapered region 124 is preferably between 5 and 25 thousandths of an inch and most preferably between 8 and 12 thousandths of an inch.

By creating bevel 126, a greater amount of material is left in proximity to cutting edge 70. This provides greater life and better cutting, particularly on relatively tough materials such as aluminum. Without bevel 126, cutting edge 70 tends to chip which soon leads to a poorer quality cut. Optimally, cutter blade 31 is made from a chip resistant steel such as S7 steel which also increases the life and precision of cutting edge 70.

Figure 9:
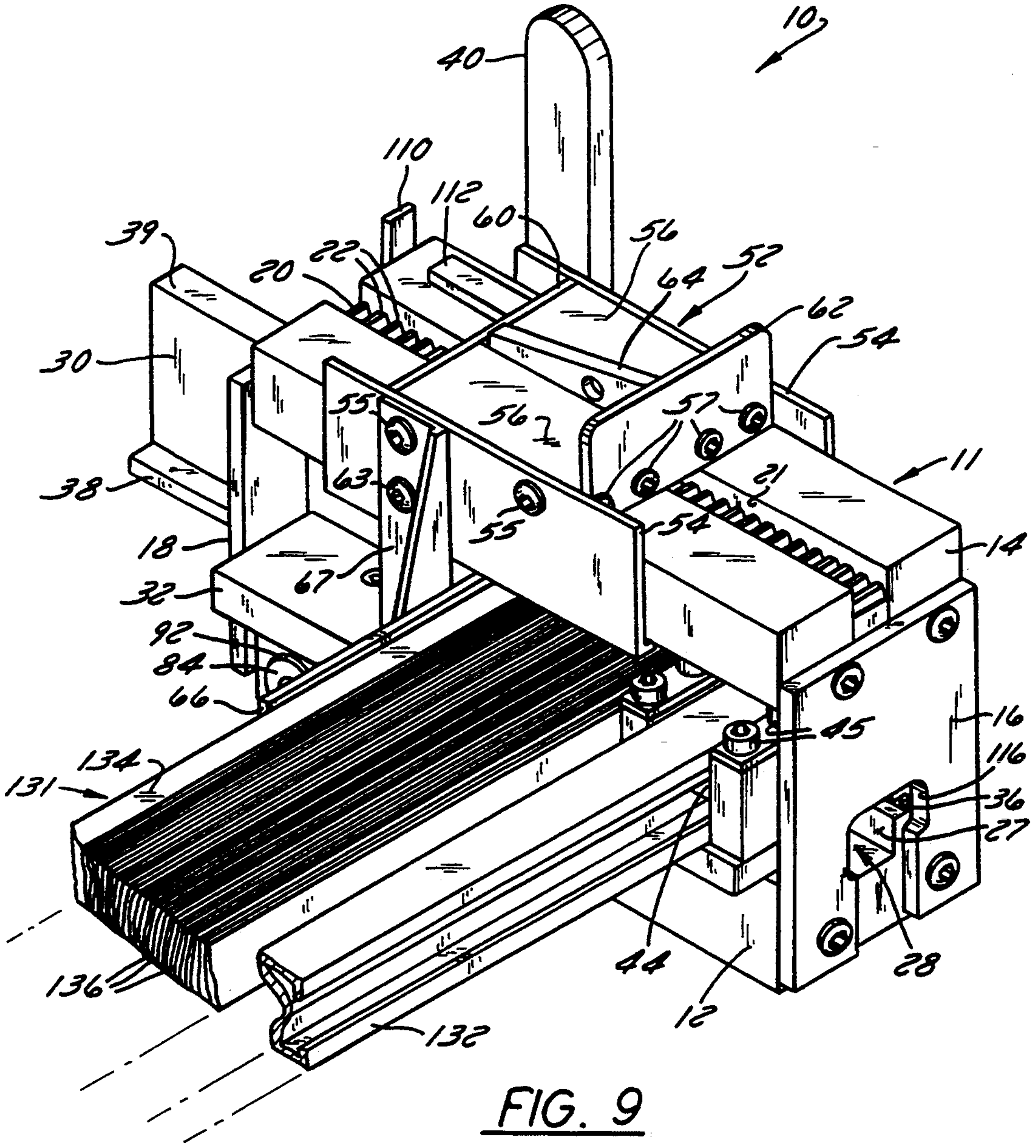
FIG. 9 is a perspective view showing a head rail, bottom rail, and plurality of slats disposed in the mini blind cutter.

The positioning of mini blind 131 in mini blind cutter 10 is illustrated in FIG. 9. A head rail 132 is disposed in receiving area 26 for cutting. Similarly, a bottom rail 134 and a plurality of mini blind slats 136 are disposed in receiving area 24 for cutting. In FIG. 9, for purposes of clarity, only some of the main components of cutter 10 have been labeled with reference numerals. Head rail 132 is disposed over anvil 44 and bottom rail 134 along with slats 136 are securely held by clamp assembly 52.

Figure 10:
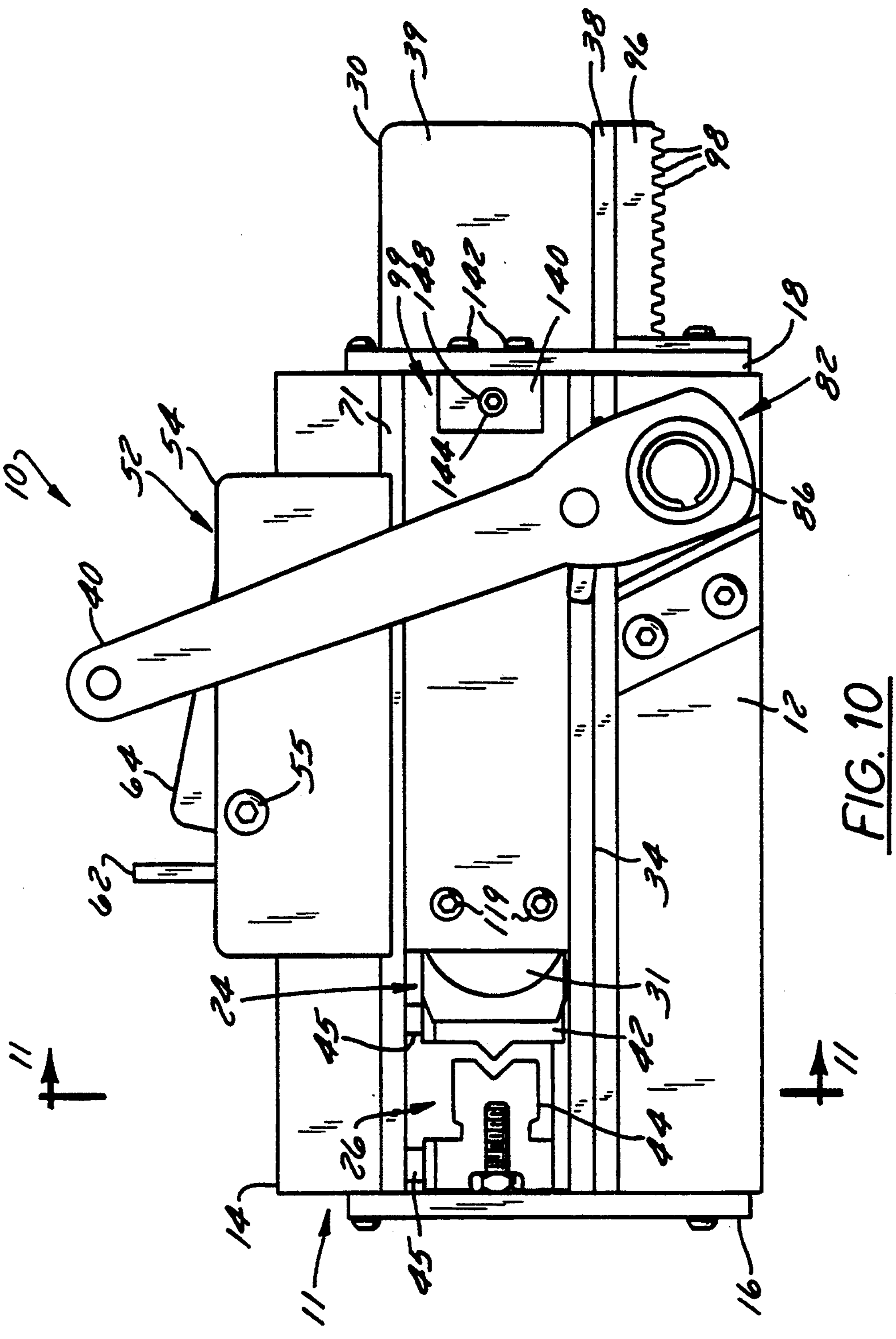
FIG. 10 is a back view of the mini blind cutter showing an alternate embodiment of the retention system.
Figure 11:
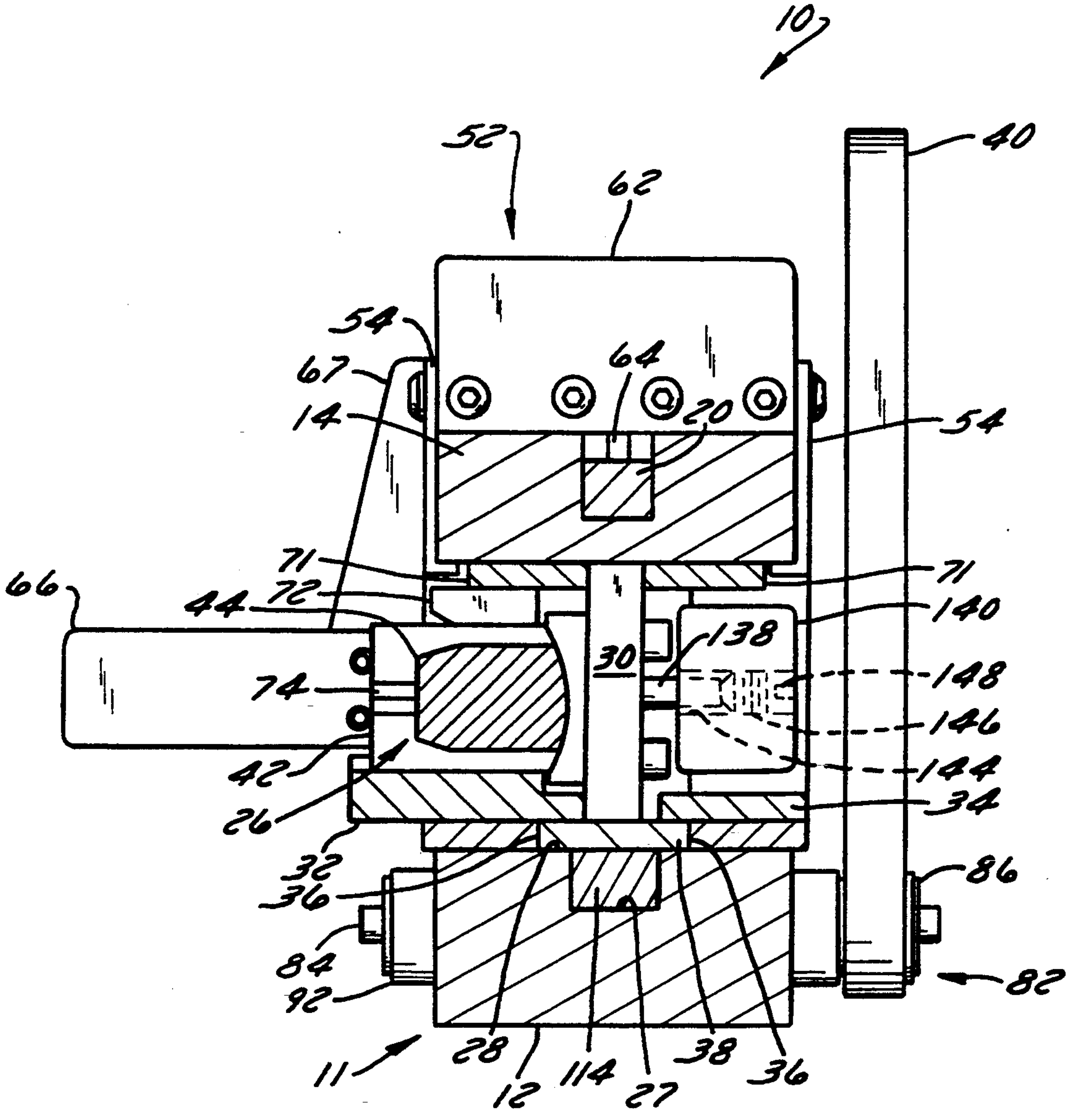
FIG. 11 is a cross-sectional view taken generally along line 11—11 of FIG. 10.

An alternate and preferred embodiment of retention assembly 99 is shown in FIGS. 10 and 11 where, for clarity, some of the reference numerals have been omitted. In this embodiment, cutter blade 31 is maintained against the mini blind components being cut by a pressure friction member 138 acting against slide rail 30. The alternate retention assembly 99 includes a mounting block 140 attached to second end plate 18 by a pair of fasteners 142, such as screws. Mounting block 140 has a bore 144 therethrough for receiving pressure member 138 generally perpendicular to slide rail 30. Bore 144 also includes a threaded region 146 for receiving a set screw 148 which biases pressure member 138 against slide rail 30.

By adjusting set screw 148, the force against pressure member 138 and the friction force on rail 30 are changed, making movement of slide rail 30 either easier or more difficult. Optionally, a spring (not shown) could be interposed between member 138 and screw 148 to bias member 138 against slide rail 30. By way of example, pressure member 138 may be made from a variety of materials such as Teflon®.

With this alternate retention assembly, slide rail 30 is preferably moved by ratcheting handle 40. For instance, after cutting the bottom rail, mini blind slats, and head rail, slide rail 30 is returned towards second end 18 by switching ratcheting mechanism 86 to its reverse mode and moving handle 40. Although slide rail 30 could potentially be moved by hand, the resistance of pressure member 138 is more easily overcome by using ratchet handle 40.

It will be understood that the foregoing description is of a preferred exemplary embodiment of this invention and that the invention is not limited to the specific form shown. For example, different materials may be used in the construction of the components, various types of fasteners and fastening methods may be used to join the various components together, the ratcheting mechanism may be mounted in areas other than the ratchet handle, and the configuration of the shear plate and anvil may be changed to accommodate different types of head rails. These and other modifications may be made in the design and arrangement of the elements without departing from the scope of the invention as expressed in the appended claims.

We claim:

1. A mini blind cutter for downsizing a mini blind by cutting off an end of the mini blind, the mini blind being of the type that includes a head rail having an interior surface and an exterior surface, a bottom rail, and a plurality of slats, the mini blind cutter comprising:
- a framework;
- a receiving area disposed within the framework for receiving the end of the mini blind;
- a slide bar assembly slidably mounted in the framework, the slide bar assembly being oriented for sliding motion towards and away from the receiving area, wherein the slide bar assembly includes a rack having a plurality of teeth;
- a cutter blade affixed to the slide bar and including a cutting edge disposed towards the receiving area;
- a pinion gear rotatably mounted in the framework in mating engagement with the rack; and
- a ratchet handle mechanically coupled to the pinion gear for rotating the pinion gear, wherein rotation of the pinion gear imparts sliding motion to the slide bar assembly, wherein the receiving area comprises a first receiving area for receiving the mini blind bottom rail and slats and a second receiving area for receiving the head rail, the first receiving area and second receiving area being separated by a shear plate against which the plurality of slats are disposed during cutting, the mini blind cutter further including an anvil disposed in the second receiving area at a location sufficiently spaced from the shear plate to receive at least a portion of the headrail therebetween.

2. The mini blind cutter of claim 1, wherein the anvil has an external profile contoured to generally match the interior surface of the head rail.

3. The mini blind cutter of claim 2, wherein the anvil includes a V-shaped cut-out portion configured to cooperate with the headrail.

4. The mini blind cutter of claim 3, wherein the anvil includes a beveled edge to facilitate insertion of the head rail into the second receiving area.

5. The mini blind cutter of claim 1, further comprising a retention system for maintaining the cutter blade in a position adjacent the mini blind being cut.

6. The mini blind cutter of claim 5, the retention system including a pressure member biased against the slide bar assembly.

7. The mini blind cutter of claim 5, the retention system including a retention rack affixed to the slide bar assembly and a pivotable retainer pawl which engages the retention rack to maintain the cutter blade in the adjacent position, wherein the retainer pawl may be pivoted out of engagement with the retention rack to release the cutter blade.

8. The mini blind cutter of claim 1, wherein the cutter blade has a contoured cutting edge.

9. The mini blind cutter of claim 8, wherein the contoured cutting edge is arcuate.

10. The mini blind cutter of claim 8, wherein the cutter blade includes a longitudinal axis and a tapered region which tapers at a first acute angle with the longitudinal axis towards the contoured cutting edge.

11. The mini blind cutter of claim 10, wherein the cutter blade includes a bevel extending between the tapered region and the cutting edge, the bevel being disposed at a second acute angle with the longitudinal axis, the second acute angle being greater than the first acute angle.

12. The mini blind cutter of claim 1, further comprising a clamp assembly to hold the mini blind bottom rail and mini blind slats in the first receiving area during cutting.

13. The mini blind cutter of claim 12, wherein the clamp assembly is slidably mounted on the framework and includes a clamping bar that contacts the mini blind.

14. The mini blind cutter of claim 13, wherein the clamp assembly includes a pivoting pawl which cooperates with a top rack mounted on the framework to selectively clamp the mini blind bottom rail and slats.

15. A mini blind cutting system, comprising:
- a framework;
- a receiving area disposed within the framework;

a mini blind including a head rail portion having an interior surface and an exterior surface, a bottom rail portion, and a plurality of mini blind slat portions, each individual slat portion being disposed in contact with the next adjacent slat portion, wherein at least one of the portions is disposed in the receiving area;

a slide bar assembly slidably mounted in the framework, the slide bar assembly being oriented for sliding motion towards and away form he receiving area, wherein the slide bar assembly includes a rack having a plurality of teeth;

a cutter blade affixed to the slide bar and including a cutting edge disposed towards the receiving area;

a pinion gear rotatably mounted in the framework in mating engagement with the rack; and a ratchet handle mechanically coupled to the pinion gear for rotating the pinion gear, wherein rotation of the pinion gear imparts sliding motion to the slide bar assembly to move the cutter blade through the portions of the mini blind disposed within the receiving area.

16. The mini blind cutter system of claim 15, wherein the receiving area comprises a first receiving area in which the bottom rail portion and slat portions are disposed and a second receiving area in which the head rail portion is disposed.

17. The mini blind cutter system of claim 16, further comprising an anvil disposed in the second receiving area and having an external profile contoured to generally match the interior surface of the head rail portion.

18. The mini blind cutter system of claim 17, further comprising a retention system for maintaining the cutter blade in a position adjacent the mini blind as it is cut.

19. The mini blind cutter system of claim 18, wherein the cutter blade includes a longitudinal axis and a tapered region which tapers at a first acute angle with the longitudinal axis towards the contoured cutting edge and a bevel being disposed at a second acute angle with the longitudinal axis, the second acute angle being greater than the first acute angle.

* * * * *